April 21, 1936.  C. A. MARIEN  2,038,515
PISTON PACKING RING
Original Filed Jan. 25, 1932  2 Sheets-Sheet 1
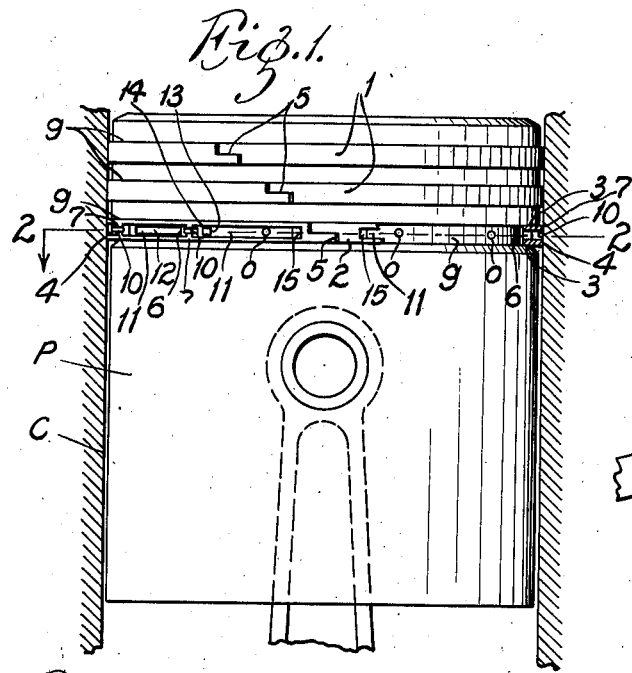
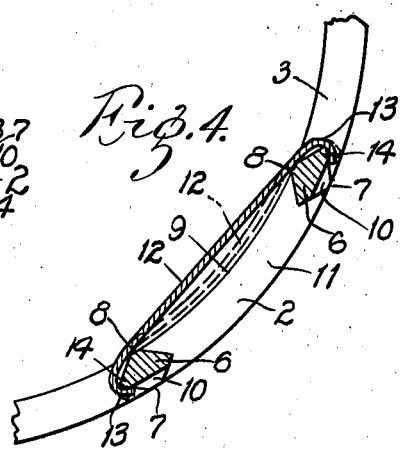
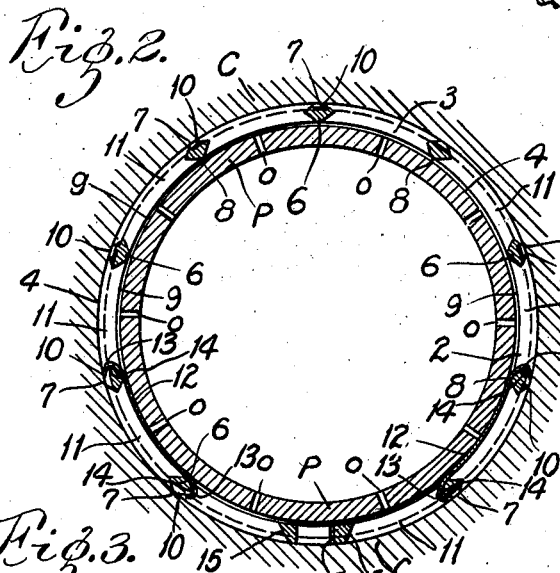
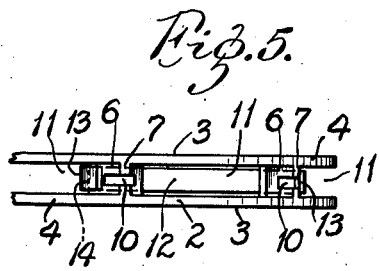
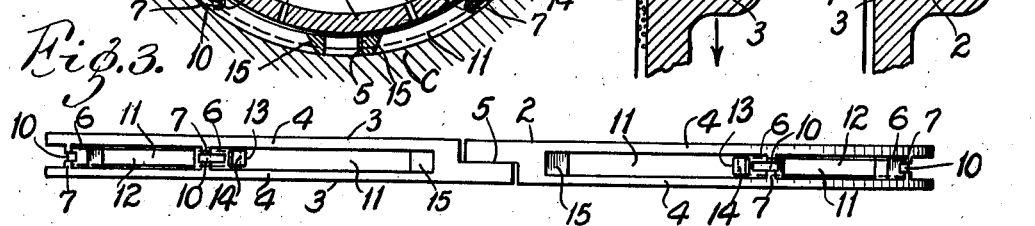
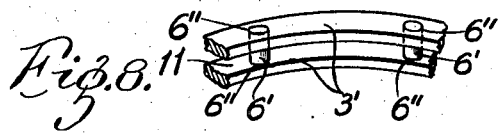
INVENTOR.
CHARLES A. MARIEN
BY Harry A. Benner
ATTORNEY.

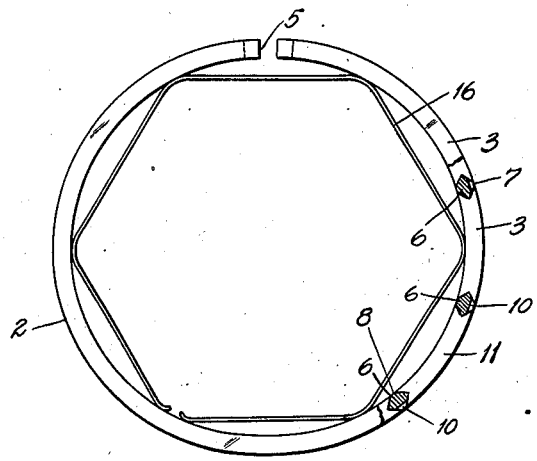
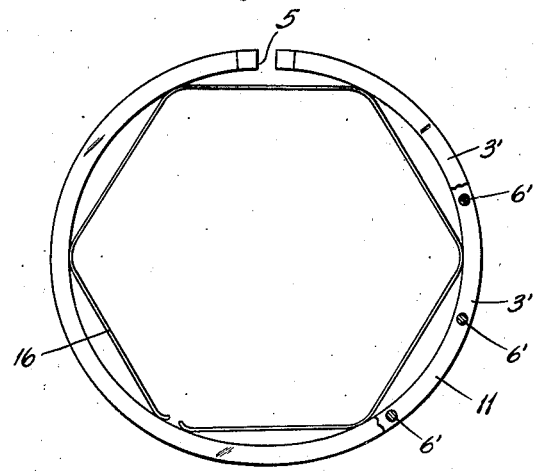

Patented Apr. 21, 1936

2,038,515

UNITED STATES PATENT OFFICE 2,038,515

PISTON PACKING RING

Charles A. Marien, St. Louis, Mo., assignor to Ramsey Accessories Manufacturing Corporation, St. Louis, Mo., a corporation of Missouri Application January 25, 1932, Serial No. 588,562
Renewed March 20, 1933

7 Claims. (Cl. 309—45)

My invention has relation to improvements in piston packing rings for internal combustion engines, and consists in the novel features of construction more fully set forth in the specification and pointed out in the claims.

The present invention is directed more particularly to what is known in the trade as oil rings in contradistinction to compression rings, in that the ring is especially designed to prevent the passing of oil beyond the piston into the compression space of the cylinder. The ring is also designed to maintain operative contact with the cylinder wall by virtue of its inherent tension and does not rely upon an expanding spring placed behind it to insure this operative contact, although an expanding spring may be used with the packing ring if desired.

I have discovered that the principal reason for the passage of oil over the face of the piston ring is the setting up of hydraulic pressure on the bottom, or oil scraping edge, of the ring during the downward power stroke of the piston. When the horizontal component of this hydraulic pressure, caused by the oil accumulation ahead of the rapidly moving ring, exceeds the pressure with which the ring is held against the cylinder wall the ring is momentarily unseated and oil allowed to escape past the face of the ring. The escape of the oil relieves the pressure and the ring again seats itself against the cylinder wall, but the oil that has escaped passes up into the combustion chamber of the cylinder and causes carbonization.

The object of my improved piston ring is to trap the oil that escapes past the bottom edge of the ring before it has an opportunity to pass entirely beyond the ring, and allow the trapped accumulations to discharge back into the crankcase through the piston wall. I accomplish this object by providing an oil ring having two components fixed in spaced relation. The space between the components serves as an oil reservoir for receiving any increments of oil that pass the bottom edge of the ring during the downward stroke of the piston. The manner in which my improved construction carries out the objects sought, as well as additional advantages inherent in the invention, will be better apparent from a detailed description thereof in connection with the accompanying drawings, in which;

Figure 1 is a side elevation of a conventional piston showing my improved oil ring disposed in the lower ring groove, a part of the ring being broken away; Fig. 2 is a horizontal cross-section taken on the line 2—2 of Fig. 1; Fig. 3 is a side elevation of my improved piston ring; Fig. 4 is an enlarged plan view of a section of the ring and stiffening spring to increase the tension near the ends of the ring; Fig. 5 is a side elevation of the ring section shown in Fig. 4; Fig. 6 is an enlarged cross-sectional detail through the piston wall showing my improved ring disposed in a piston ring groove during the downstroke of the piston; Fig. 7 is a similar section to that of Fig. 6 showing how the ring is shifted in the groove during the upstroke of the piston; Fig. 8 is a fragment of a modified construction of ring embodying the principles of the invention; Fig. 9 is a plan view of the ring illustrated in Figs. 1 to 7, inclusive, with a polygonal expander shown in place of the flat spring for the purpose of augmenting the tension of the ring; and Fig. 10 is a similar view of the ring shown in Fig. 8 with a polygonal expander disposed within the ring.

Referring to the drawings, P represents a piston adapted for operation in an engine cylinder C, said piston being provided with the customary ring grooves $g$, $g$, $g$ for holding the piston rings 1, 1 and 2. The upper rings 1, 1 are compression rings and form no part of the present application, while the lower ring 2 is the oil ring and embodies the subject-matter of this application. The ring 2 is preferably a snap ring, that is, a ring having sufficient inherent tension to hold it in operative engagement with the cylinder wall, although, if desired, this tension may be boosted by inserting an expanding ring (not shown) behind the ring 2.

My improved ring 2 comprises two similar ring components 3, 3 in juxtaposition, each having a working face 4 adapted to be maintained in operative contact with the wall of cylinder C by the inherent tension of the ring. The ring is split or has a gap 5 to permit its being disposed in the piston ring groove and is made so that it will expand outwardly and bear against the cylinder wall with substantial pressure. This, of course, is well understood in the art. The ring components 3, 3 are maintained in fixed spaced relation by a plurality of pillars 6, 6, etc., of diamond-shaped cross-section and formed integrally (in the present instance) with the components 3, 3. However, the pillars 6 need not be formed integrally with the ring components but may be in the form of pins 6' which are driven through openings 6'', 6'' in the ring components 3', 3' as shown in Fig. 8.

The pillars 6 of the main form of the invention, shown in Figs. 1 to 7 inclusive, have outer faces 7 lying in the same plane with the working faces 4, 4 of ring components 3, 3 and have inner faces 8 lying in the same plane with the inner faces 9, 9 of ring components 3, 3. Face 7 of each pillar 6 is provided with a groove, or recess, 10 midway between ring components 3, 3 and parallel thereto so as to establish free communication between the parts of the space 11 on opposite sides of the pillar 6. A further advantage of recess 10 is that it reduces the possibility of the ring bearing against the faces 7 of the pillars instead of the faces 4, 4 of the ring components 3, 3 should the latter become worn through use.

Since the size of the piston ring groove $g$ is standardized, the overall dimensions of the piston ring 2 must correspond to the size of the groove in which the piston ring is to operate. Therefore, the cross-sectional area of each ring component 3 must needs be small as considerable of the groove width is accounted for by the presence of the space 11 between the ring components. As a result of the reduced cross-sectional area of the ring components it is not possible to provide sufficient inherent tension to prevent a rapid vibrating action at the ring ends. This rapid vibratory movement has been referred to as "ring fluttering" and has been overcome to a large extent in the present invention by boosting the tension of the ring on each side of the gap 5 by means of a flat spring 12. The spring 12 extends between the first two pillars 6, 6 on each side of the gap 5 and has its ends bent over to form terminal hooks 13, 13 which engage the opposite corners 14, 14 of the pillars 6, 6 between which the spring 12 extends. It is apparent from an inspection of Fig. 2 that when the ring 2 is seated in the piston ring groove $g$ the springs 12, 12 will be distorted by engagement with the bottom of the ring groove and thus impose additional tension on the piston and stiffen the same in the region of the pillars 6, 6 engaged by the spring. This stiffening of the ring 2 on both sides of the gap 5 overcomes the tendency of the ring ends to flutter. The ends of the ring components 3, 3 are also maintained in fixed spaced relation by the terminal pillars 15, 15.

In the operation of the piston the ring 2 will hug the top wall of the groove $g$ on the downward stroke (as shown in Fig. 6) and oil will be scraped from the wall of cylinder C by the bottom edge $e$ of the ring. Owing to the high speed of travel of the piston the accumulations of oil against this edge $e$ produce a hydraulic pressure that at times becomes great enough to overcome the pressure holding the ring against the cylinder wall and thus unseats the ring 2 allowing the oil to flow past the face 4 of the lower ring component 3. As rapidly as this oil escapes past the lower component 3 it is received in the space 11 between the ring components instead of passing on beyond the face 4 of the upper ring component. There is no opportunity for the pressure to build up in the space 11 because of the free drainage from this space through ports $o$ leading from the bottom of the groove through the piston wall. Of course, some oil will be stored in the space 11 on the downward stroke of the piston and some will drain out through ports $o$. As soon as the piston starts to move upwardly (Fig. 7) the ring 2 shifts to the opposite side of the ring groove 3 and hugs the bottom wall of said groove and some oil remains in the space 11 between the ring components. The rapid upward travel of the piston creates a hydraulic pressure on the edge $e'$ which may become great enough to unseat the ring in like manner as on the downward stroke of the piston and allow the oil to escape past the face 4 of the lower component 3 and again be spread over the cylinder wall. Thus, the single ring 2 performs substantially the functions of a compression ring and an oil ring since the lower component 3 serves to control the oil and the upper component 3 serves to hold the compression.

Because of the small area of the faces 4, 4 of the ring components 3, 3 the unit pressure of the ring against the cylinder wall is considerably greater than in piston rings as heretofore constructed. In fact, the present construction enables the working faces of the ring to be reduced to an absolute minimum and provides for a comparatively large oil receiving chamber for trapping excess oil and thus preventing its escape past the ring into the cylinder combustion space.

Another important feature of my improved ring that contributes greatly to its effective prevention of oil pumping is the flaring of the spaces (or slots) 11 at their ends due to the oppositely inclined faces of the diamond-shaped pillars. In other words, the longitudinal extent (or length) of the slots, is as great on the inner surface of the ring as on the outer surface thereof. The obstruction by the pillars to free ingress and egress of the oil to and from the spaces 11 between the ring components is reduced to a minimum—in fact such obstruction is negligible. Thus, the pillars 6 are large enough to maintain the ring components in rigid, fixed relation but so shaped as to permit the flow of oil through the ring almost as freely as if they were not there. Any carbon particles that may lodge in the slot 11 will immediately be washed through the slot by the freely flowing oil.

The shape of the pillars and, of course, resulting shape of slots eliminates shelf or ledge formations on which carbon could collect as in slotted rings as now constructed.

The principal objection to the slotted piston rings now in general use is that the slots have converging end walls, or they are provided with ledges or some other device to stiffen the ring so to retain sufficient tension to hug the cylinder wall. These slot obstructing devices offer a lodging place for carbon particles which build up a serious obstruction to the free passage of oil through the slot. Therefore, the ring may perform perfectly when first put into use but as the carbon accumulates the ring efficiency is cut down, until finally the slots are closed and the ring no longer has any function as an oil ring.

According to the features of construction of my invention such obstructing ledges are not needed to boost the ring tension. Applicant utilizes springs 12 for increasing the tension of the ring otherwise reduced by the large size of the slots 11. Instead of the plurality of springs 12 I may use a single spring or polygonal expander 16 with equal results.

I have, therefore, provided a ring that is effective in stopping oil pumping, and remains effective until worn out. At the same time, the ring has sufficient tension to insure high unit pressure against the cylinder wall throughout its life.

Having described my invention, I claim:

1. A split piston ring for engines comprising ring components in spaced relation, a plurality of pillars between the components and spaced around the ring circumference for holding said components in fixed relation, and a flat spring extending between and anchored to the first and second pillar on each side of the split in the ring.

2. A piston ring for engines comprising two similar ring components in spaced relation and each having a comparatively narrow cylinder contacting face, a plurality of pillars arranged between said components and around the circumference thereof to hold said components in definitely fixed relation, and a leaf spring expander detachably secured at opposite ends to two of said pillars.

3. A split piston ring for engines comprising two similar ring components in spaced relation and each having a comparatively narrow cylinder contacting face, a plurality of pillars arranged between said components in definitely fixed relation, and a leaf spring expander detachably secured to adjacent pillars.

4. A split piston ring for engines comprising ring components in spaced relation, a plurality of pillars between the components and spaced around the ring circumference for holding said components in fixed relation, and flat springs extending between and anchored to adjacent pillars.

5. A piston ring for engines comprising two similar ring components in spaced relation and each having a comparatively narrow cylinder contacting face, and a plurality of pillars arranged between said components and around the circumference thereof to hold said components in definitely fixed relation, the sides of each pillar having portions tapering outwardly and inwardly from a medial line of the pillar so as not to constrict the spaces between the ring components.

6. A piston ring for engines comprising two similar ring components in spaced relation, and a plurality of pillars arranged between said components and around the circumference thereof to hold said components in definitely fixed relation, the sides of each pillar having portions tapering outwardly and inwardly from a medial line of the pillar so as not to constrict the space between the ring components.

7. A piston ring comprising a split annulus having a plurality of radial openings extending therethrough, said openings lying in a common plane and being spaced around the annulus circumference which forms the cylinder contacting face of the piston ring, and a series of grooves in said cylinder contacting face connecting the openings, said grooves being narrower than the openings to form a constricted passage between adjacent openings.

CHARLES A. MARIEN.